(12) United States Patent
Bowman

(10) Patent No.: US 7,325,445 B1
(45) Date of Patent: Feb. 5, 2008

(54) AIR TEST TO DETERMINE SURFACE ROUGHNESS

(75) Inventor: James Darwin Bowman, Adams, TN (US)

(73) Assignee: Robert Bosch GmbH, Stuttgart (DE)

( * ) Notice: Subject to any disclaimer, the term of this patent is extended or adjusted under 35 U.S.C. 154(b) by 73 days.

(21) Appl. No.: 10/904,311

(22) Filed: Nov. 3, 2004

(51) Int. Cl.
*G01B 13/22* (2006.01)

(52) U.S. Cl. .............................. 73/104; 73/37; 73/37.5; 73/105

(58) Field of Classification Search ................... 73/104, 73/105, 37, 37.5, 37.6, 37.7
See application file for complete search history.

(56) References Cited

U.S. PATENT DOCUMENTS

| | | | | |
|---|---|---|---|---|
| 2,417,988 A | * | 3/1947 | Mooney | 73/37 |
| 2,479,606 A | * | 8/1949 | Douglass | 73/37.9 |
| 2,963,900 A | * | 12/1960 | Kuebler | 73/37 |
| 3,855,843 A | * | 12/1974 | Yagiela et al. | 73/37 |
| 4,019,379 A | * | 4/1977 | Wartelle et al. | 73/105 |
| 5,209,103 A | * | 5/1993 | Driviere et al. | 73/37 |
| 5,582,966 A | * | 12/1996 | Nakamura et al. | 430/569 |

\* cited by examiner

*Primary Examiner*—Daniel S. Larkin
(74) *Attorney, Agent, or Firm*—Leo H. McCormick, Jr.; Sarah Taylor

(57) ABSTRACT

A surface roughness measuring apparatus (11) has a probe (27, 41) with a smooth surface region (31, 43) contoured to conform to a surface (33) the roughness of which is to be measured, and an aperture (25, 49) located generally centrally of the smooth surface region of the probe. Illustratively, the workpiece surface is a generally flat annular surface portion of a disk brake rotor (35). The test probe surface is juxtaposed with the workpiece surface and a fluid pressure modifying mechanism such as an air vacuum pump (15) and driving motor (17), which are coupled to the probe aperture, are energized to induce a fluid pressure differential between the aperture and peripheral portions of the surface region. A fluid parameter monitoring device such as air flow meter (23) or air pressure meter (19) measures a fluid response to the induced fluid pressure differential and the roughness is inferred from the measured fluid behavior. A valve (21) for selectively blocking fluid flow between the aperture (25) and the vacuum pump (15) allows the fluid pressure measuring device (19) to determine the rate of change of the induced fluid pressure differential, or a measure of the fluid flow may be utilized to infer the roughness of the workpiece surface. A similar fluid behavior technique may be employed using the probe on a sample of known surface roughness to calibrate the system.

7 Claims, 3 Drawing Sheets

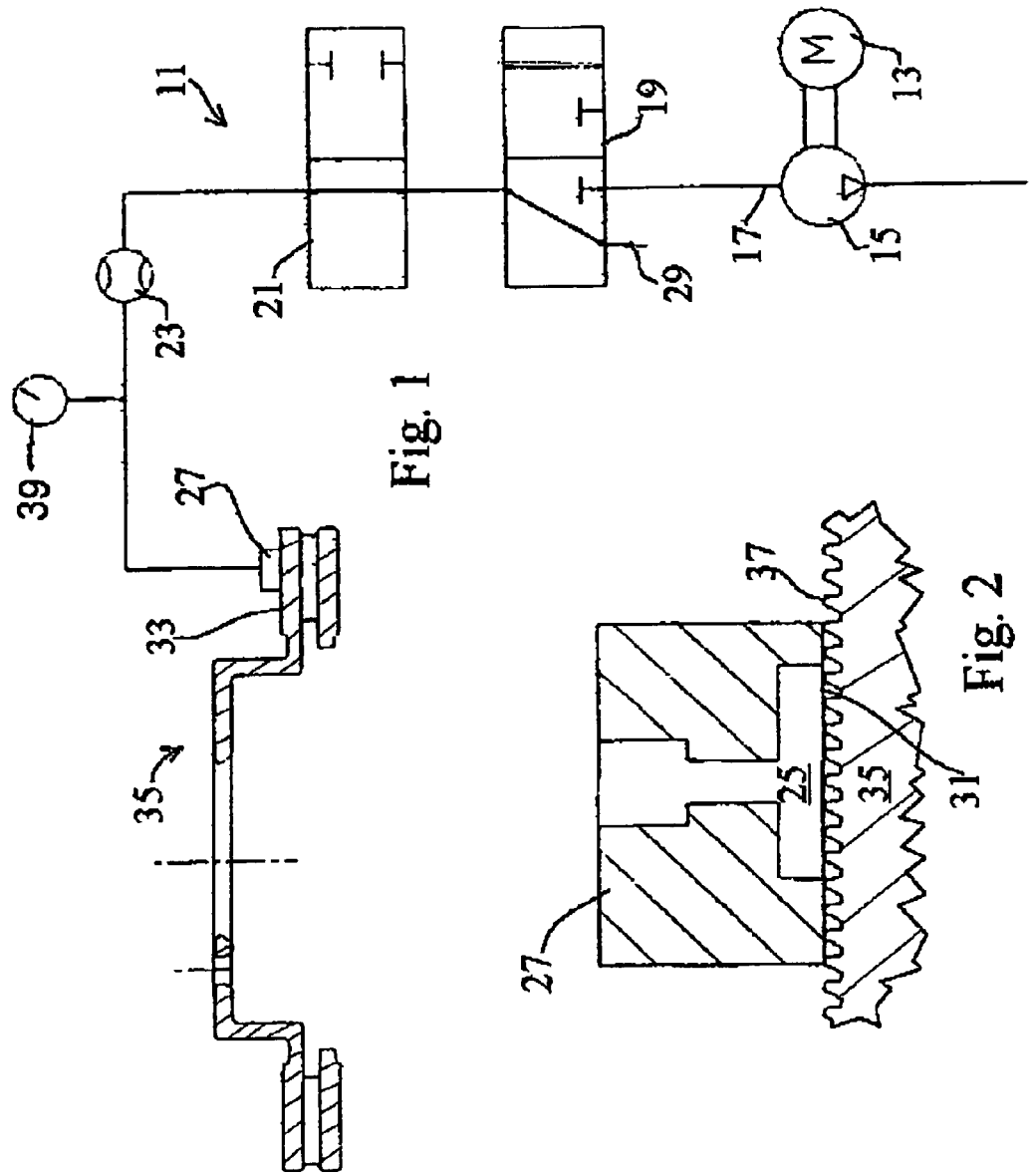

AIR TEST TO DETERMINE SURFACE ROUGHNESS

BACKGROUND OF THE INVENTION

1. Field of the Invention

The present invention relates to material testing devices and techniques, and more particularly to an arrangement for measuring the surface roughness of a workpiece.

2. Description of the Related Art

It is desirable to determine the roughness of a surface in a variety of situations. For example, a manufacturing process may involve the machining of a workpiece surface and machining introduced surface roughness may be required to be kept within certain limits. The gauging process should determine the relative roughness of a surface accurately and in a minimal amount of time.

Several devices have been developed that have as their purpose the measurement of surface roughness. The need for some measurement of surface finish for various machining operations was brought about by the necessity of having smooth bearing surfaces. The simplest procedure is a visual comparison with some established standard. Microscopic comparison is an extension of this approach. Light interference techniques to establish scratch depth has also been used. Currently known technology for determining surface roughness typically fit two categories. Contact roughness measurement measures the dimensional profile of the surface by contacting the surface with a stylus and dragging it across the surface measuring peaks and valleys. An index is then calculated based on the data collected. This process is restrictive due to the excessive amount of time required to probe the surface. Also, contact style gages utilize a fine stylus to scan the surface. Because the stylus has to be small enough to read minuscule peaks and valleys of the surface, it is susceptible to damage. Non-contact contour measurement technology utilizes a laser to scan the surface to measure the peaks and valleys. While this technology is fast, it can be significantly skewed by surface contamination. Other, more exotic techniques have been suggested including measuring surface electrical capacity, sonic transmission, or the contact angle of a drop of fluid. None of these techniques has proven to be entirely satisfactory.

SUMMARY OF THE INVENTION

The present invention provides a measure of a characteristic of the surface roughness rather than the dimensional variations in the surface.

If two objects have perfectly flat surfaces and are positioned so that the flat surfaces are contacting each other, no voids exist between them. If one of the objects has a hole perpendicular to the flat surface and a pressurized air source is applied through the hole there will be no leak path for the air source. If the mating surface is not perfectly, flat there will be a leak path between the two surfaces. The size of the leak path will be proportional to the degree of roughness of the mating surface. The size of the leak path can be quantified by, applying an air pressure source through the hole in one of the pieces and measuring the amount of air that flows through the leak path. Similarly, the drop in air pressure due to air escaping through the leak path measured over time, can be used to characterize the size of the leak path.

The invention comprises, in one form thereof, a process of inferring a measure of the roughness of a workpiece surface which includes engaging a foot of a test probe with the workpiece surface and establishing an air pressure differential across the junction between the workpiece surface and test probe foot. The foot of the probe should have a surface shape highly similar to the shape of the workpiece surface and the surfaces may be joined by a suitable clamping technique. The resulting pressure differential induced air flow along the junction is measured and a measure of the roughness of the workpiece surface is inferred from the measured air flow. An initial calibration may be performed by engaging the foot of the test probe with a sample surface of known roughness and establishing an air pressure differential across the junction between the sample surface and test probe foot. Workpiece surface roughness is then inferred when a measure of the resulting pressure differential induced air flow along the junction between the sample surface and test probe foot is compared with the measured air flow along the junction between the workpiece surface and test probe foot. Preferably, when using this calibration technique, the air pressure differential established between the sample surface and test probe foot is substantially the same as the air pressure differential established between the workpiece surface and test probe foot. Also, the foot of the test probe is clamped to the sample surface with a predetermined force and the foot is clamped to the workpiece surface with substantially the same predetermined force.

An advantage of the present invention is that measurements are largely unaffected by surface contamination.

Another advantage is that the present invention allows for quick yet accurate measurement of surface roughness.

Further advantages of this invention include that it is relatively inexpensive to produce, is easily adaptable to determining surface finish or roughness on a wide variety of products, and the test probe can be designed to virtually eliminate any possibility of probe damage. The invention has been proven with a variety of surface roughnesses, including known value roughness comparison masters. The test process is repeatable and, within the roughness range measured, yields a linear relationship as compared to the contact type roughness gage.

BRIEF DESCRIPTION OF THE DRAWINGS

FIG. 1 is a schematic illustration of surface roughness measuring apparatus according to the present invention in one form;

FIG. 2 is an enlarged cross-sectional view of the test probe and workpiece of FIG. 1;

Corresponding reference characters indicate corresponding parts throughout the several drawing views.

DETAILED DESCRIPTION OF THE INVENTION

Figure 4:
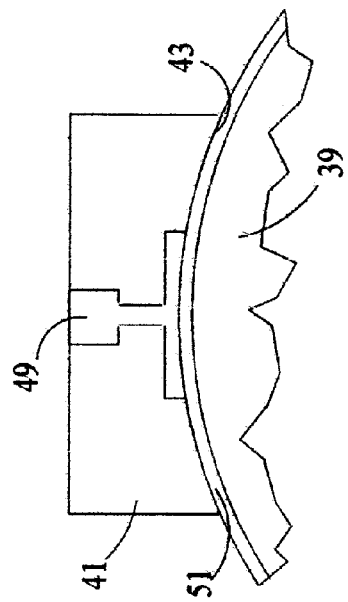
FIG. 4 is a view in cross-section along lines 4-4 of FIG. 3.

Referring now to the drawings and particularly to FIG. 1, there is shown one apparatus 11 for measuring surface roughness. The apparatus may include an air source such as motor 13 and pump 15. The acting test air source can be positive (a pressurized air source) or negative (a vacuum source). A vacuum source (air flow downwardly as viewed) is preferred since it tends to draw the test probe to the test piece. Pressurized air will tend to force the test probe away, from the test piece, but can be overcome with an appropriate clamp fixture. With the pump functioning as a vacuum source, the pump inlet 17 is coupled to a source valve 19 which, when enabled, couples the vacuum source with a normally open isolation valve 21. In the normal or unenabled condition, valve 21 provides an air pathway between flow meter 23 and source valve 19. When valve 19 is in its unenabled state, it provides an air pathway from valve 21 to the atmosphere as illustrated by conduit 29 providing an initial condition where no pressure differential exists between aperture 25 (FIG. 2) and ambient air. The isolation valve 21 inlet is connected with an air flow meter 23 which, in turn, is connected to a generally centrally located aperture 25 in the probe 27 as better seen in FIG. 2.

The test probe 27 has a smooth surface region such as the relatively flat lower surface or foot 31 which contacts a similarly contoured relatively flat surface 33 of a workpiece such as a disk brake rotor 35. Machining during production may have introduced a surface roughness shown by ridges and grooves 37 in the rotor 35 surface. The relative roughness of the surface 33 may be determined by either measuring the decay rate of air pressure with pressure sensor 39 or the air flow rate indicated by flow meter 23.

In the decay rate method, a test fixture probe 27 matching the profile of the test piece surface 33 to be measured is placed on that surface and attached so that is not able to move relative to the test piece. The test probe has a communication hole 25 that allows air to flow from the mating surface to the opposite side of the piece. The test probe should be sufficiently designed to fully contact the high points of the test piece surface to be measured. In the case of a relatively flat surface as illustrated in FIGS. 1 and 2, for example, the probe should be as flat and smooth as possible. The portion of the test piece surface that does not contact the test probe surface provides a leak path and a rougher test piece surface creates a larger leak path area.

The air source is applied to the test probe communication hole by energizing motor 13 and valve 19. After the air source has stabilized, the air pressure of the test system is measured by meter 19 and the isolation valve 21 is energized to close and trap the air pressure in the test system. After a defined amount of time, the system pressure is again measured by meter 19. The difference in air pressure is due to air escaping through the leak path. The amount of pressure decay per unit of time of isolation yields a decay rate for the given test piece surface. The rate of decay is proportional to the size of the leak path. The leak path is a result of the test piece surface roughness and the ability of the test probe to seal on the test piece surface. The decay rate of the workpiece is compared to the decay rate of "master" test pieces with known roughness to determine a relative roughness. The test setup used to determine master decay rate should be as nearly identical as possible to that used to determine workpiece decay.

The flow rate method is similar in many respects. When the air source is applied to the test probe communication hole 25, the amount of airflow through the test system is measured with an in-line flow meter 23. The flow rate through the system is proportional to the size of the leak path (workpiece surface roughness). The flow rate of the workpiece is compared to the flow rate of test pieces with known roughness to determine a relative roughness. Again, the test setup used to determine master flow rate should be nearly identical to that used to determine workpiece flow, e.g., employ the same probe at the same pressure or vacuum source level and, if a positive pressure is applied, the clamping force holding the probe to the sample should be the same for each.

Either the flow rate technique or pressure decay rate technique provides a relatively quick and accurate method of determining surface roughness and either yields repeatable results. These methods of determining surface roughness are less sensitive to minor variations in surface contour than other contact and non-contact roughness gages, are relatively inexpensive and are more robust than other contact style surface roughness gages. Of course, the gauges illustrated may be remotely located and coupled to transducers in the air flow path or the system otherwise suitably automated.

Figure 3:
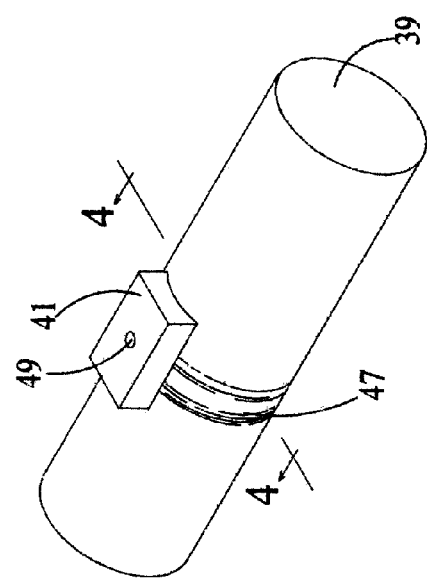
FIG. 3 is a perspective view of another workpiece and juxtaposed roughness sensing probe.

Test probe 27 of FIGS. 1 and 2 has a flat smooth foot or workpiece contact surface 31 and may be employed on a wide variety of flat workpieces, however, when testing other than flat surfaces, an initial preparation in the form of contouring the probe foot (45 in FIG. 7) to match the contour of the workpiece surface is needed. In FIG. 3, an illustrative generally cylindrical workpiece 39 formed, for example, by a turning process such as on a lathe, has surface roughness such as circumferential tool marks 47. Of course, other roughness features may also be present. A test probe 41 is made with the foot 43 shaped as a portion of a cylindrical surface of the same radius as the workpiece 39. When the vacuum source is applied to the centrally located aperture 49, a primarily circumferential air flow along grooves such as 51 from peripheral portions of the interface between the test probe surface and the sample surface to either side of the probe as viewed in FIG. 4 enters and passes upwardly through the probe.

Figure 6:
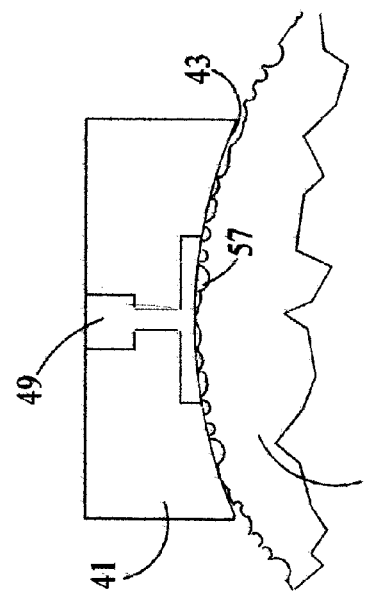
FIG. 6 is a view in cross-section along lines 6-6 of FIG. 5.
Figure 5:
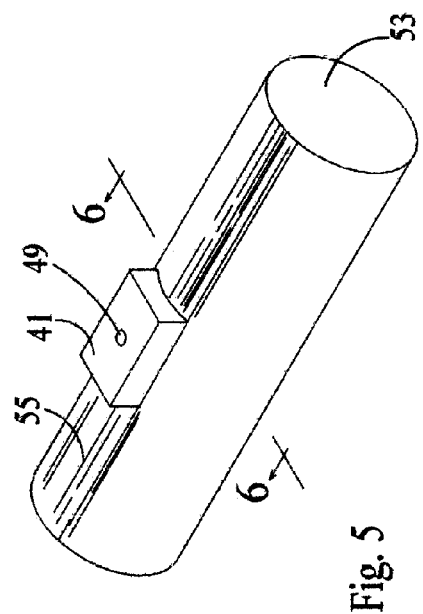
FIG. 5 is a perspective view of a further workpiece and probe.

A different workpiece 53 formed as a cylinder of the same radius as cylinder 39, but by a different technique such as by extrusion, has surface roughness illustrated by longitudinal tool marks 55. This time, when the vacuum source is applied to the centrally located aperture 49, a primarily longitudinal air flow (toward and away from the page) along grooves such as 57 from the opposite ends of the probe as viewed in FIG. 6 enters and passes upwardly through the probe. The tool marks of FIGS. 3 and 5 are illustrative only and most workpieces will have a less regular surface roughness.

Figure 7:
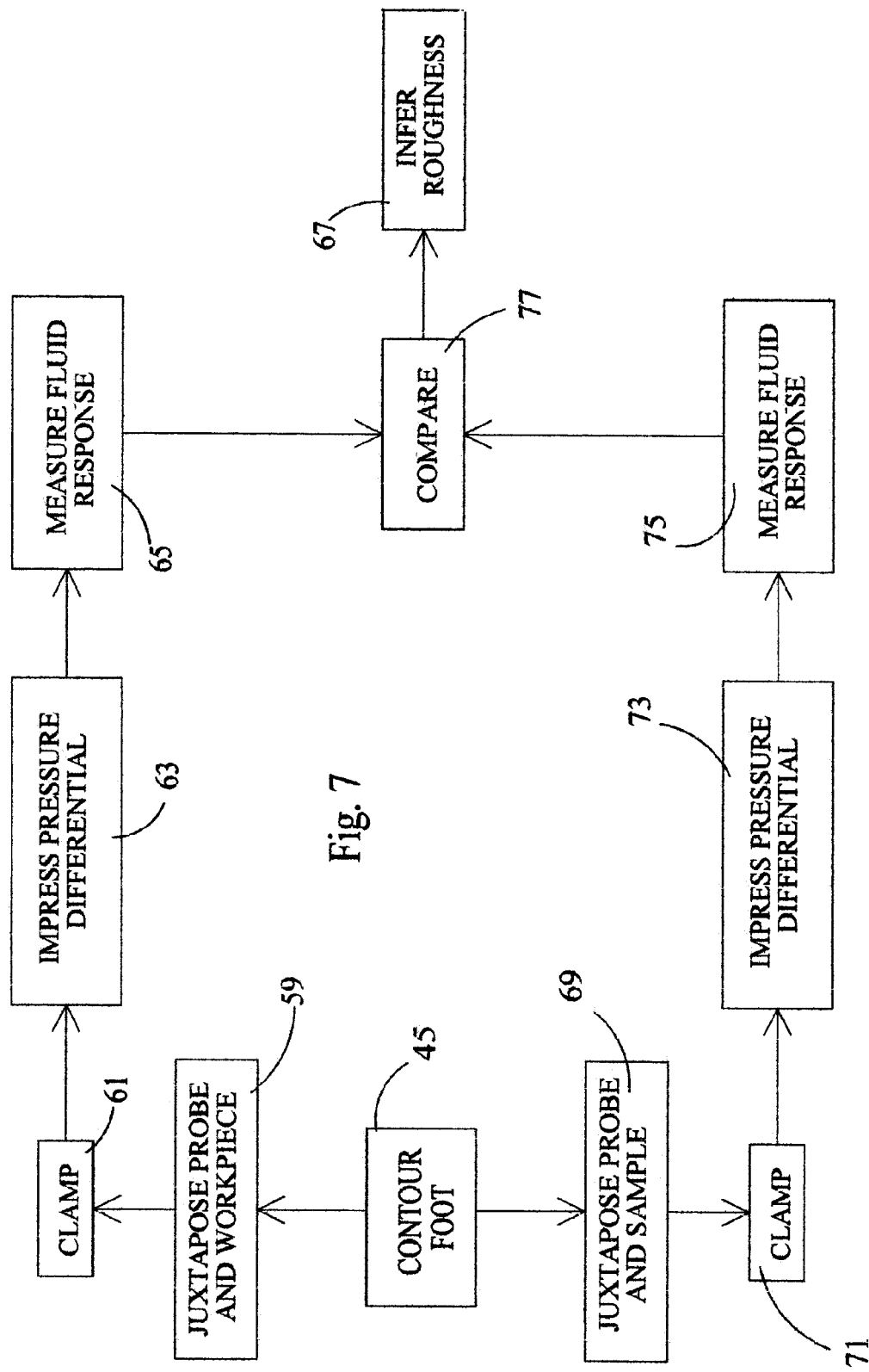
FIG. 7 is a schematic diagram of the process of inferring a measure of surface roughness.

The process of inferring a measure of the roughness of a workpiece surface is illustrated in FIG. 7 where a test probe surface and the workpiece surface are illustrated as being juxtaposed at 59 by engaging the foot of the test probe with a sample surface. If an appropriate probe is not available, it may be necessary to shape or contour the probe foot to match the surface of the workpiece to be measured as indicated at 45. A firm and consistent contact between the probe and workpiece may be maintained by suitably clamping the two together as illustrated at 61. A fluid (ambient air is preferred) pressure differential is impressed at 63 between peripheral portions of the interface between the test probe surface and the workpiece surface, and a central region of the probe thereby establishing an air pressure differential across the junction between the workpiece surface and test probe foot. A fluid response to the impressed fluid pressure differential is measured at 65 and a measure of the roughness of the workpiece surface is inferred at 67 from the measured fluid response.

If initial calibration is needed, the test probe surface may be juxtaposed with a sample surface of known roughness as at 69, similarly clamped at 71, and a fluid pressure differential impressed as shown at 73 between peripheral portions of the interface between the test probe surface and the sample surface, and a central region of the probe. The steps 63 and 73 of impressing a fluid pressure differential is preferably achieved by lowering the fluid pressure at the central region of the probe relative to the fluid pressure along peripheral portions of the interface between the test probe surface and the workpiece surface. A fluid response to the impressed fluid pressure differential is measured at 75 and the roughness inference made by comparing at 77 the measured fluid response 65 relative to the workpiece surface to the measured fluid response 75 relative to the sample surface. The steps 65 and 75 of measuring may be achieved by measuring the flow of fluid while maintaining the pressure differential at a preferred level, or by terminating the impressing of a fluid pressure differential and thereafter measuring the time rate of change of fluid pressure. Calibration is preferably performed under conditions as nearly as possible the same as actual test conditions, hence, the air pressure differential established at 73 between the sample surface and test probe foot is substantially the same as the air pressure differential established at 63 between the workpiece surface and test probe foot, and the foot is clamped to the sample surface with a predetermined force at 71 and the foot is clamped at 61 to the workpiece surface with substantially the same predetermined force.

Some of the steps illustrated in FIG. 7 may be performed only once, or not at all for some situations. For example, the process may be applied to a production operation where the only inferred roughness is to determine whether each part is above or below an accept or reject level. Once that level is established, steps 45, 69, 71, 73 and 75 would be omitted and the comparison at 77 would be to the fluid response corresponding to a predetermined minimum acceptable level of smoothness.

What is claimed is:

1. A process of inferring a measure of the roughness of a workpiece surface, comprising the steps of:
    juxtaposing a surface on a probe and the workpiece surface;
    impressing a fluid pressure differential between peripheral portions of an interface between the test probe surface, the workpiece surface and a central region of the probe;
    measuring a fluid response to the impressed fluid pressure differential while maintaining the pressure differential at a preferred level;
    terminating the impressing of the fluid pressure differential;
    measuring the time rate of change of said pressure differential after said termination; and
    inferring a measure of the roughness of the workpiece surface from the measured fluid response.

2. The process of claim 1, wherein the step of juxtaposing includes urging the workpiece and probe surfaces into engagement with a predetermined force.

3. The process of claim 1, wherein the fluid comprises ambient air.

4. The process of claim 1, including the preliminary step of contouring a foot of the probe to have a surface shape highly similar to the shape of the workpiece surface.

5. The process of claim 1, including the additional steps of:
    engaging the foot of the test probe with a sample surface;
    establishing an air pressure differential by air flowing across the junction between the sample surface and test probe foot;
    measuring a resulting pressure differential caused by said air flow along the junction between the sample surface and test probe foot; and
    comparing the measured air flow along the junction between the sample surface and test probe foot with the measured air flow along the junction between the workpiece surface and test probe foot.

6. The process of claim 1, wherein the air pressure differential established between the sample surface and test probe foot is substantially the same as the air pressure differential established between the workpiece surface and test probe foot.

7. The process of claim 1, wherein the step of engaging the foot of the test probe with a sample surface includes clamping the foot to the sample surface with a predetermined force, and the step of engaging a foot of a test probe with the workpiece surface includes clamping the foot to the workpiece surface with substantially the same predetermined force.

* * * * *